US012447072B2

(12) United States Patent
Cook et al.

(10) Patent No.: US 12,447,072 B2
(45) Date of Patent: Oct. 21, 2025

(54) TRENDELENBURG PATIENT POSITIONING DEVICE

(71) Applicant: D.T. Davis Enterprises, Ltd., Allentown, PA (US)

(72) Inventors: Patrick Cook, Allentown, PA (US); Scott Moore, Allentown, PA (US); John Englebert, Allentown, PA (US)

(73) Assignee: D.T. DAVIS ENTERPRISES, LTD., Allentown, PA (US)

( * ) Notice: Subject to any disclaimer, the term of this patent is extended or adjusted under 35 U.S.C. 154(b) by 28 days.

(21) Appl. No.: 17/726,852

(22) Filed: Apr. 22, 2022

(65) Prior Publication Data

US 2022/0339045 A1 Oct. 27, 2022

Related U.S. Application Data

(60) Provisional application No. 63/178,273, filed on Apr. 22, 2021.

(51) Int. Cl.

| | |
|---|---|
| ***A61G 1/013*** | (2006.01) |
| ***A61G 1/048*** | (2006.01) |
| ***A61G 7/005*** | (2006.01) |
| ***A61G 7/10*** | (2006.01) |
| ***A61G 13/04*** | (2006.01) |
| ***A61G 13/12*** | (2006.01) |

(52) U.S. Cl.

CPC ............. *A61G 1/013* (2013.01); *A61G 1/048* (2013.01); *A61G 7/005* (2013.01); *A61G 7/1026* (2013.01); *A61G 7/1028* (2013.01); *A61G 13/04* (2013.01); *A61G 13/1265* (2013.01)

(58) Field of Classification Search

None

See application file for complete search history.

(56) References Cited

U.S. PATENT DOCUMENTS

| | | | | |
|---|---|---|---|---|
| 4,528,704 | A * | 7/1985 | Wegener | A61G 7/1028 180/125 |
| 5,076,643 | A * | 12/1991 | Colasanti | A47C 7/467 297/284.6 |
| 5,280,657 | A * | 1/1994 | Stagg | A61G 7/1026 5/81.1 R |
| 9,849,053 | B2 * | 12/2017 | Rigoni | F16K 15/20 |
| 9,962,122 | B2 | 5/2018 | Augustine et al. | |
| 10,765,580 | B1 * | 9/2020 | Augustine | B32B 9/007 |
| 2012/0304384 | A1 * | 12/2012 | Scholz | A61F 7/00 5/81.1 R |

(Continued)

OTHER PUBLICATIONS

European Patent Office, International Search Report and Written Opinion issued for corresponding International Patent Application No. PCT/US2022/025953 on Sep. 19, 2022.

*Primary Examiner* — Adam C Ortiz

(74) *Attorney, Agent, or Firm* — Duane Morris LLP

(57) ABSTRACT

Embodiments of an inflatable transfer device including a top panel, a bottom panel coupled to the top panel to define an inflatable chamber therebetween, and a high-friction surface coupled to the top panel are disclosed. A top edge of each of the stringers is coupled to the top panel and a bottom edge of each of the stringers is coupled to the bottom panel. The high-friction surface is configured to maintain a patient in a fixed position when the inflatable transfer device and the patient are positioned at an angle with respect to a horizontal support surface.

19 Claims, 16 Drawing Sheets

(56) References Cited

U.S. PATENT DOCUMENTS

| | | | | |
|---|---|---|---|---|
| 2018/0250180 | A1* | 9/2018 | Phalen | A61G 1/01 |
| 2018/0353360 | A1* | 12/2018 | Kea | A61G 13/1265 |
| 2019/0175382 | A1* | 6/2019 | Scott | A61F 5/3707 |

* cited by examiner

TRENDELENBURG PATIENT POSITIONING DEVICE

CROSS-REFERENCE TO RELATED APPLICATION

This application claims benefit to U.S. Provisional Application Ser. No. 63/178,273, filed Apr. 22, 2021, entitled "Trendelenburg Patient Positioning Device," the disclosure of which is incorporated herein by reference in its entirety.

BACKGROUND

In some surgical operations, a patient is placed in a Trendelenburg position in which the head of the patient is positioned lower than the feet of the patient. The Trendelenburg position may include positioning of the patient at an angle from about 15 degrees to about 25 degrees relative to a horizontal plane defined by a fixed surface, such as a plane defined by a floor of a surgical theatre, hospital room, etc. or other support surface. In some surgical operations, such as robotic surgery, a variation of the Trendelenburg position including an angle of about 25 degrees to about 45 degrees with respect to the horizontal plane may be used. This position is commonly referred to as a steep Trendelenburg position. A further modification includes positioning the patient's head above the patient's feet at similar angles, such as, for example, 15 degrees to about 25 degrees or about 25 degrees to about 45 degrees, relative to the horizontal surface. This position is commonly referred to as a reverse Trendelenburg position.

Currently, moving patients on to and off of adjustable/tiltable tables present issues for both surgical staff and patients. Post-operation movement can disturb patients physically, causing discomfort, pain, or displacement of surgically positioned elements. Current operating room transfer systems are not capable of providing both a secure position on an operating room table in an angled position (e.g., Trendelenburg, steep Trendelenburg, reverse Trendelenburg, etc.) and ease of movement of a patient on to or off of a surgical table.

SUMMARY

In various embodiments, an inflatable transfer device including a top panel, a bottom panel coupled to the top panel to define an inflatable chamber therebetween, a plurality of stringers positioned within the inflatable chamber, and a high-friction surface coupled to the top panel is disclosed. A top edge of each of the stringers is coupled to the top panel and a bottom edge of each of the stringers is coupled to the bottom panel. The high-friction surface is configured to maintain a patient in a fixed position when the inflatable transfer device and the patient are positioned at an angle with respect to a horizontal support surface.

In various embodiments, a method of performing a surgical procedure is disclosed. The method includes a step of positioning an inflatable transfer device on an operating surface. The inflatable transfer device includes a top panel, a bottom panel coupled to the top panel to define an inflatable chamber therebetween, a plurality of stringers positioned within the inflatable chamber, and a high-friction surface coupled to the top panel, wherein a top edge of each of the stringers is coupled to the top panel and a bottom edge of each of the stringers is coupled to the bottom panel. The method further includes positioning the inflatable transfer device and the operating surface at an angle with respect to a horizontal support surface. The high-friction surface is configured to maintain a patient in a fixed position when the inflatable transfer device and the patient are angled with respect to the horizontal support surface. The method further includes performing a surgical procedure and transferring the inflatable transfer device to a second surface. The inflatable transfer device is transferred by providing an air flow to the inflatable chamber to generate an air bearing beneath the bottom panel of the inflatable transfer device.

In various embodiments, an inflatable transfer device is disclosed. The inflatable transfer device includes a top panel, a bottom panel coupled to the top panel to define an inflatable chamber therebetween, a plurality of stringers positioned within the inflatable chamber, and a high-friction foam material coupled to the top panel. A top edge of each of the stringers is coupled to the top panel and a bottom edge of each of the stringers is coupled to the bottom panel. The high-friction foam material is configured to maintain a patient in a fixed position when the inflatable transfer device and the patient are positioned at an angle with respect to a horizontal support surface. The top panel includes a substrate configured to reduce elongation of the high-friction foam material.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
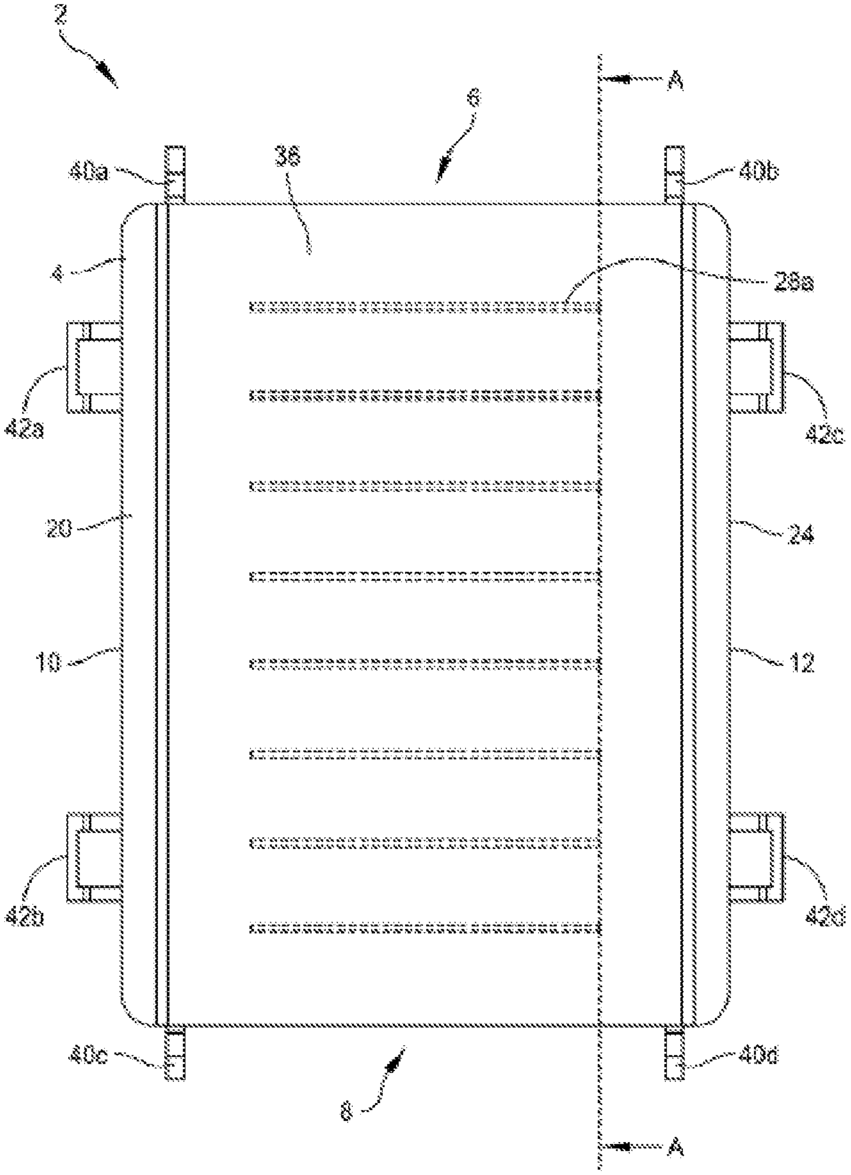
FIG. 1 illustrates a top view of an inflatable transfer device configured for use in an angled operating position, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," "superior," "inferior," etc., as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship.

As used herein, the term "substantially" denotes elements having a recited relationship (e.g., parallel, perpendicular, aligned, etc.) within acceptable manufacturing tolerances. For example, as used herein, the term "substantially parallel" is used to denote elements that are parallel or that vary from a parallel arrangement within an acceptable margin of error, such as +/−5°, although it will be recognized that greater and/or lesser deviations can exist based on manufacturing processes and/or other manufacturing requirements.

In various embodiments, an inflatable transfer device configured for use in an angled operating position, such as a Trendelenburg, reverse Trendelenburg, or steep Trendelenburg position, is disclosed. In some embodiments, the inflatable transfer device includes a body defining an internal volume. The body includes a top panel and a bottom panel coupled together (either directly or through intervening elements) to define an inflatable internal cavity or chamber. The top layer includes a high-friction surface or material configured to maintain a patient in a fixed position relative to the inflatable transfer device when an adjustable surface supporting the inflatable transfer device and patient, such as an operating room table, is positioned in an angled operating position. Upon completion of one or more surgical operations, the inflatable transfer device is used to transfer the patient from the adjustable surface to one or more additional surfaces, such as a stretcher, gurney, mobile bed, other transportation device, and/or other support surface.

Figure 2:
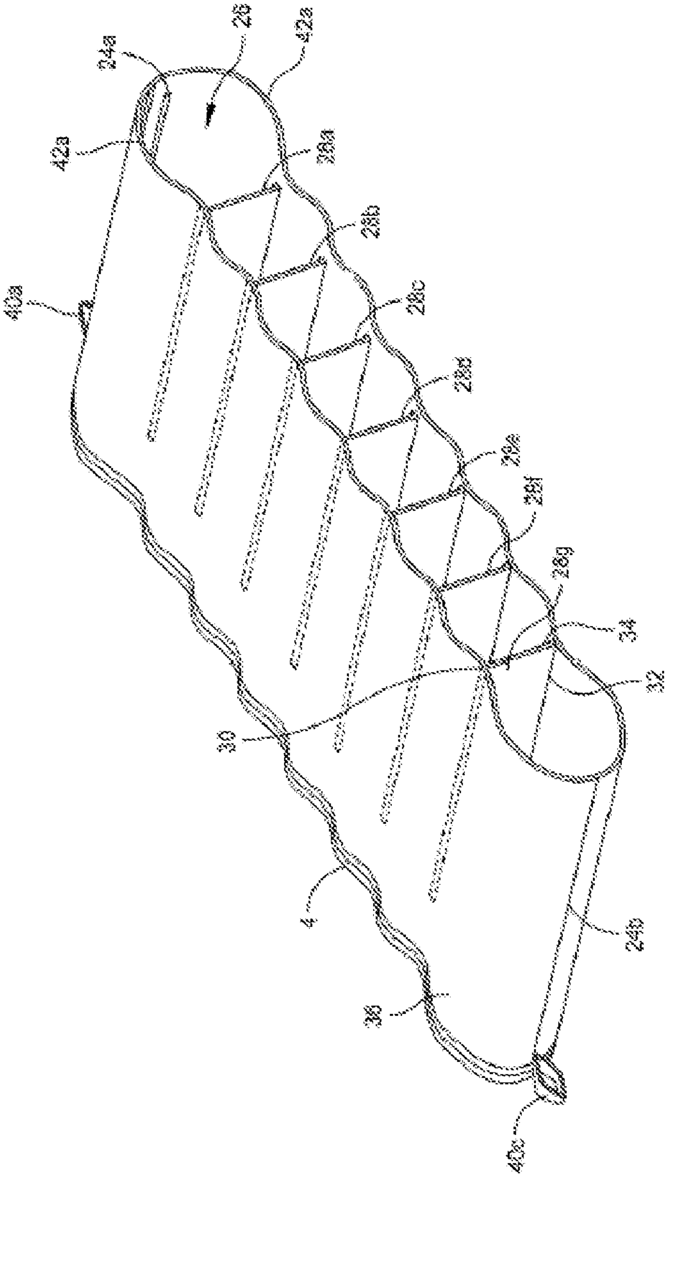
FIG. 2 illustrates a cross-sectional view of the inflatable transfer device taken along line A-A of FIG. 1, in accordance with some embodiments.
Figure 3:
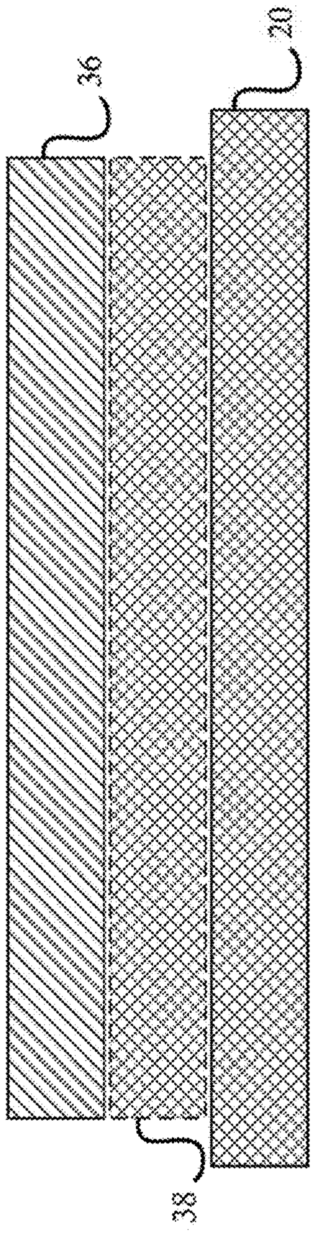
FIG. 3 illustrates a cross-sectional view of a top layer of the inflatable transfer device of claim 1, in accordance with some embodiments.

FIGS. 1-3 illustrate an inflatable transfer device 2 configured for use in an angled operating position, in accordance with some embodiments. The inflatable transfer device 2 includes a body 4 extending between a superior end 6 and an inferior end 8. A first side 10 and a second side 12 of the body 4 extend substantially between the superior end 6 and the inferior end 8. The superior end 6, inferior end 8, first side 10, and second side 12 substantially define a perimeter 24 of the body 4. The transfer body 4 includes at least a top panel 20 and a bottom panel 22. Each of the top panel 20 and the bottom panel 22 include a flexible material sheet. The perimeter 24 of the transfer body 4 is defined, at least partially, by a perimeter **24*a* of the top panel 20 and a perimeter 24*b* of the bottom panel 22**.

In some embodiments, the perimeter **24*a* of the top panel 20 and the perimeter 24*b* of the bottom panel 22 have substantially similar and/or complimentary shapes allowing the top panel 20 and the bottom panel 22 to be directly coupled and/or coupled together through an intervening material. For example, the perimeter 24*a* of the top panel 20 may be directly coupled to the perimeter 24*b* of the bottom panel 22 and/or each of the perimeters 24*a*, 24*b* may be coupled to an intervening element, such as a perimeter band (not shown). The top panel 20, the bottom panel 22, and/or an intervening perimeter band may be coupled using any suitable coupling mechanism, such as, for example, radiofrequency welding, adhesives, weldable hook fasteners, sewing, heat sealing, ultrasonic welding, and/or any other suitable coupling mechanism. Although embodiments are discussed herein including a body 4 having a top panel 20 and a bottom panel 22 having substantially similar shapes, it will be appreciated that the body 4** may be defined by panels having different shapes, additional panels, and/or continuous portions of material.

As shown in FIG. 2, the top panel 20 and the bottom panel 22 define an inflatable cavity 26 (or plenum) therebetween. The inflatable cavity 26 is configured to receive an air inflow to cause inflation of the body 4. When inflated, the body 4 supports a patient placed over and in contact with the body 4. A plurality of stringers **28*a*-28*g* (collectively referred to herein as "stringers 28") are positioned within the cavity 26. In some embodiments, each of the stringers 28 includes a top edge 30, a bottom edge 32, a first side edge 34, and a second side edge (not shown). The top edge 30 is coupled to the top panel 20 and the bottom edge 32 is coupled to the bottom panel 22. Each of the stringers 28 may be configured to lay flat when the inflatable transfer device 2 is in a deflated state and may be configured to be substantially perpendicular to the top panel 20 and/or the bottom panel 22 when the inflatable transfer device 2 is in an inflated state (as discussed in greater detail below), although it will be appreciated that one or more of the stringers 28 may be angled with respect to the top panel and/or the bottom panel in an inflated and/or deflated state. The stringers 28 provide structural stability to the inflatable transfer device 2, for example, preventing ballooning when the inflatable transfer device 2** is inflated.

Figure 8:
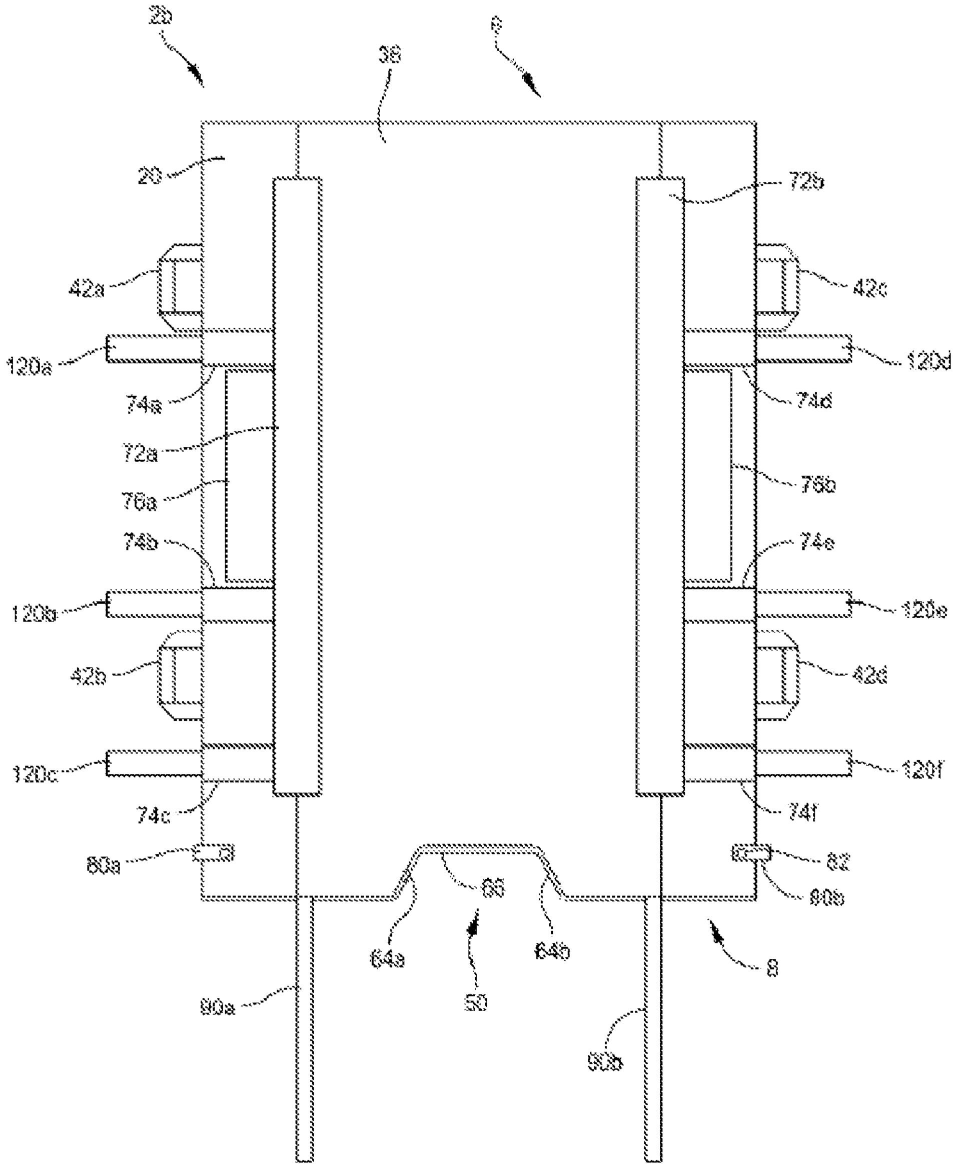
FIG. 8 illustrates a top view of an inflatable transfer device configured for use in an angled operating position and including a perineal cut out, in accordance with some embodiments.
Figure 9:
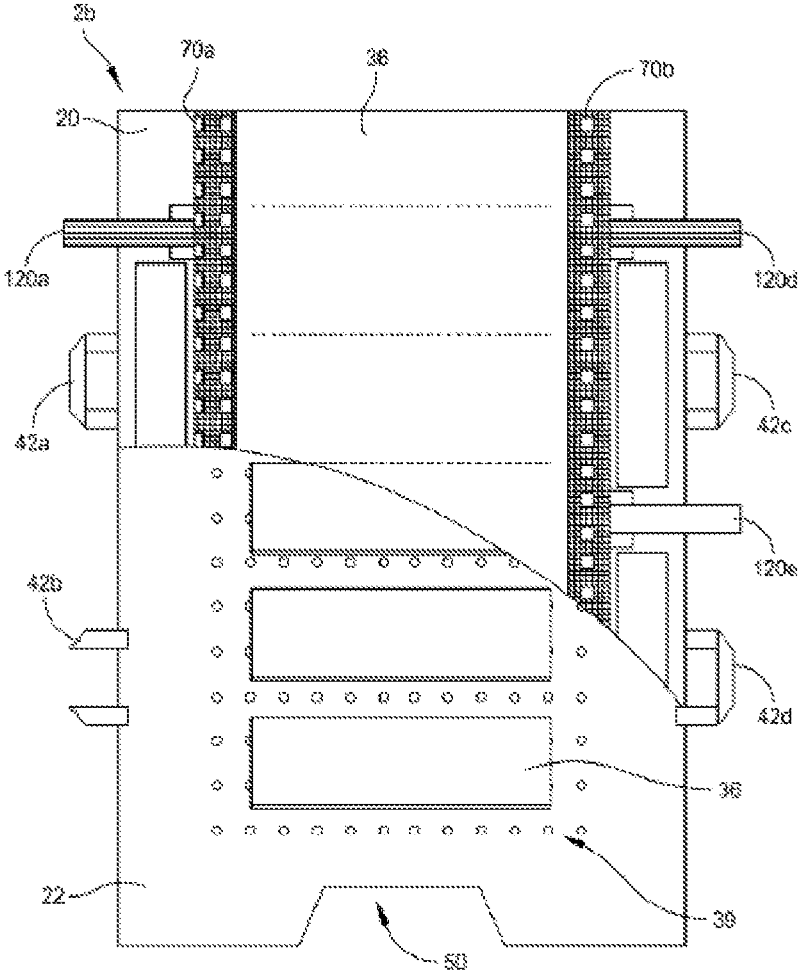
FIG. 9 illustrates a partial-cut-away top view of the inflatable transfer device of FIG. 8 having a portion of the top layer removed to illustrate internal elements, in accordance with some embodiments.
Figure 10:
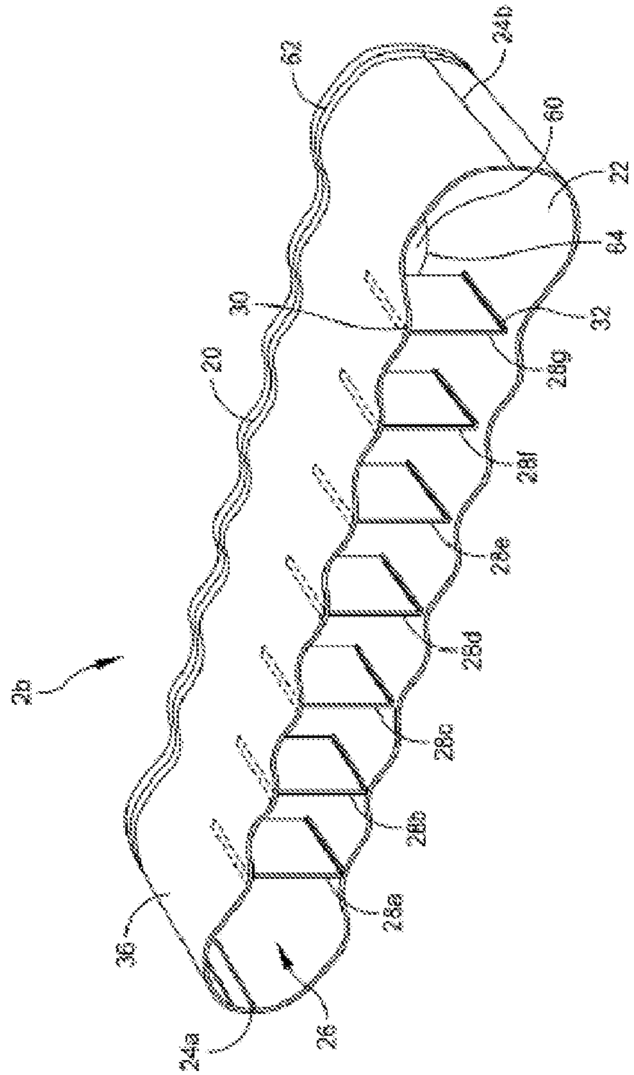
FIG. 10 illustrates a cross-sectional view of the inflatable transfer device of FIG. 8, in accordance with some embodiments.

In some embodiments, the inflatable transfer device 2 includes an air inlet (see FIG. 8) configured to couple the internal cavity 26 to an air supply. The air inlet may include any suitable air inlet, such as, for example, a one-way valve, a two-way valve, a channel, etc. The air inlet may be sized and configured so that an air supply hose may be inserted and/or coupled thereto, with the air inlet thereafter being closed (e.g., snapped shut) to maintain the air supply hose in a fixed position while the inflatable transfer device 2 is inflated. The air inlet may include any suitable coupling mechanism, such as a snap mechanism, a hook-and-loop mechanism, and/or any other releasable mechanism.

In some embodiments, the body 4 includes a high-friction surface 36 positioned above and/or formed integrally with the top panel 20. The high-friction surface 36 is configured to maintain a patient in a fixed position when the inflatable transfer device 2 and an associated surface are angled, for example, during use in a Trendelenburg procedure, reverse Trendelenburg procedure, steep Trendelenburg procedure, etc. The high-friction surface 36 may include any suitable high-friction material. For example, the high-friction surface 36 may include a high-friction foam material, such as a closed cell breathable foam, an open cell, elastomeric, non-latex foam, and/or any other suitable high-friction foam.

In some embodiments, the body 4 includes a substrate 38 coupled to the high-friction surface 36. The substrate 38 is configured to maintain the structural properties of the high-friction material 36 during use. For example, in some embodiments, the high-friction material 36 is coupled to a substrate 38 that is configured to reduce or prevent elongation of the high-friction surface 36 when in use. In some embodiments, the substrate 38 includes and/or defines the top panel 20. The substrate 38 or the top panel 20 may be coupled directly to one or more stringers 28 (e.g., may be the top panel of the inflatable transfer device 2). In some embodiments, the substrate 38 is a separate intervening layer that is coupled to and/or positioned above the top panel 20. The substrate 38 and/or the top panel 20 is coupled to the bottom panel 22 to define the inflatable cavity 26 therebetween. In various embodiments, the top layer 20, the bottom panel 22, and/or the substrate 38 may include a nylon, polyester, non-woven, and/or other material layer.

In some embodiments, the high-friction surface 36 is at least partially coupled to one or more stringers 28 to provide additional structural integrity to the high-friction material 36, to reduce stretching of the high-friction surface 36, and/or to increase the strength of the inflatable transfer device 2. For example, in some embodiments, the high-friction surface 36 may be directly coupled to the one or more stringers 28 through an intervening top layer 20 and/or substrate 38. In other embodiments, the high-friction surface 36 is coupled to the stringers 28 via an intervening layer, such as a top layer 20 and/or a substrate 38. In some embodiments, the high-friction surface 36 is releasably coupled to the substrate 38 and/or the top panel 20 to allow the high-friction surface 36 to be replaced and/or removed from the inflatable transfer device 2.

Figure 5:
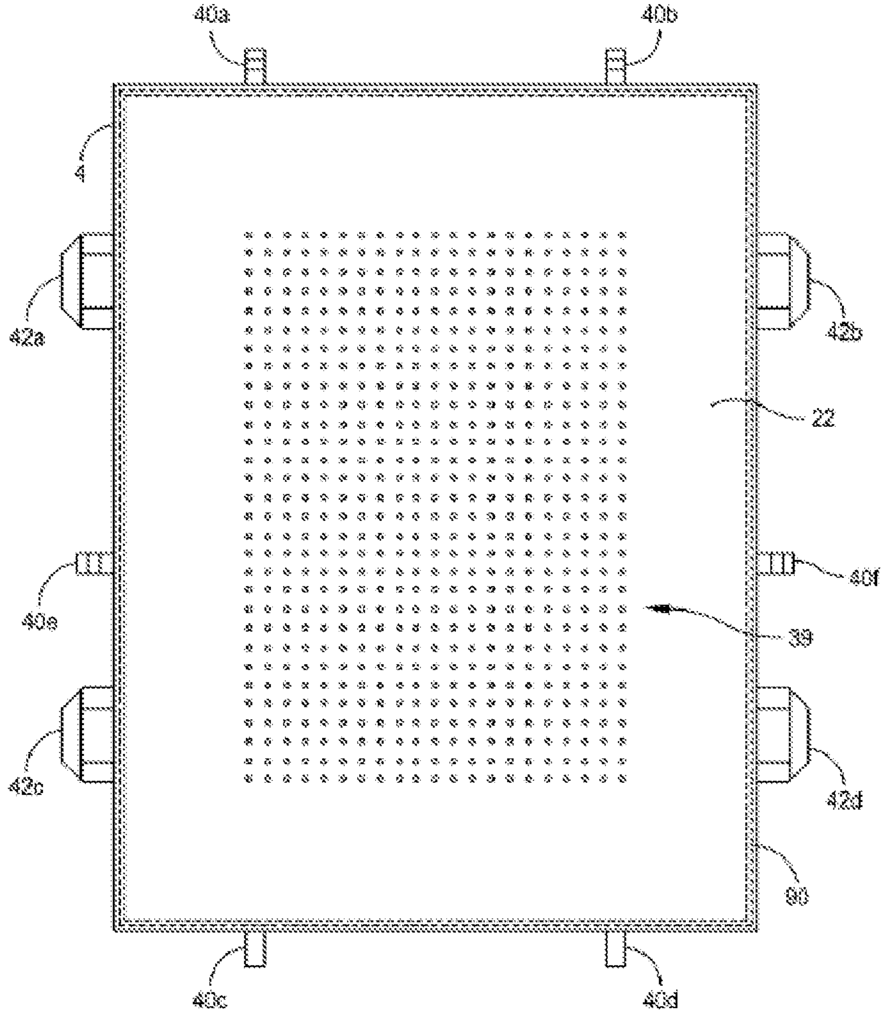
FIG. 5 illustrates a bottom view of the inflatable transfer device of FIG. 4, in accordance with some embodiments.

In some embodiments, the bottom panel 22 includes a plurality of perforations 39 (e.g., openings) formed in at least a portion of the bottom panel 22, such as, for example, a central portion of the bottom panel 22 (see FIG. 5). Each of the plurality of perforations 39 is in fluid communication with the internal chamber 26 to allow air flow from the internal chamber 26 to an area adjacent to the outer surface of the bottom panel 22. When the internal chamber is pressurized, the air outflow from the plurality of perforations 39 generates a layer of air, referred to herein as an air bearing, reducing or eliminating friction between the bottom panel 22 of the inflatable transfer device 2 and a support surface. The inflatable transfer device 2 may be moved, e.g., laterally, on the air bearing to allow repositioning of the inflatable transfer device 2 (and a patient supported by the inflatable transfer device 2) on the support surface and/or onto a different support surface.

In some embodiments, the inflatable transfer device 2 includes one or more anchor loops 40*a*-40*f* (collectively referred to herein as "anchor loops 40"). Each of the anchor loops 40 is configured to provide an attachment point for coupling the inflatable transfer device 2 to a support surface, such as an adjustable operating surface used during a surgical procedure, as discussed in greater detail below. In some embodiments, each of the anchor loops 40 is configured to be coupled to a fastener extending from a support surface (see FIG. 6). The anchor loops 40 provide predetermined locations for anchoring fasteners coupled to the support surface at predetermined attachment points to the inflatable transfer device 2. In some embodiments, the anchor loops 40 are coupled directly to the support surface.

In the illustrated embodiment, the inflatable transfer device 2 includes four anchor loops 40, two at a superior end 6 of the inflatable transfer device 2 and two at an inferior end 8. The anchor loops 40 positioned at each of the superior end 6 and the inferior end 8 may have a predetermined spacing therebetween. For example, the spacing between the first set of anchor loops 40*a*, 40*b* positioned at the superior end 6 and the spacing between the second set of anchor loops 40*c*, 40*d* positioned at an inferior end 8 may be related to the standard spacing of a predetermined support surface, such as an operating room table, to be used with the inflatable transfer device 2. The anchor loops 40 may include any suitable material coupled to any suitable portion of the inflatable transfer device. For example, in various embodiments, the anchor loops 40 include a webbing or other fabric material having a tensile strength sufficient to support a force applied by the inflatable transfer device 2 and a patient supported thereon when a support surface is placed at an angle. In various embodiments, the anchor loops 40 may be coupled to and/or extend from the top panel 20, the bottom panel 22, and/or the perimeter 24 of the inflatable transfer device 2. In some embodiments, the anchor loops 40 are releasably attached to a portion of the inflatable transfer device 2.

In some embodiments, the inflatable transfer device 2 includes one or more handles 42*b*-42*d* (collectively "handles 42"). The handles 42 provide a location for a user to grip the inflatable transfer device 2 to facilitate transfer of the inflatable transfer device 2 (and a patient supported thereon). In some embodiments, the handles 42 may be used to move an inflatable transfer device 42 and a supported patient prior to an operation or procedure (e.g., pre-op), during an operation or procedure, and/or after an operation or procedure (e.g., post-op). For example, in some embodiments, the handles 42 may be used in conjunction with the air bearing provided by the plurality of perforations 39 to reposition an inflatable transfer device 2 and a supported patient on a support surface and/or to transfer the inflatable transfer device 2 and supported patient to a separate surface. The handles 42 may include any suitable material, such as, for example, a webbing or other fabric material having a tensile strength sufficient to support a force applied by the inflatable transfer device 2 and a patient supported thereon during repositioning or transfer of the inflatable transfer device 2 and supported patient. In some embodiments, the handles 42 may provide additional and/or alternative anchor locations (e.g., may act as anchor loops) for attaching fasteners to the inflatable transfer device 2, as previously discussed with respect to anchor loops 40.

Figure 4:
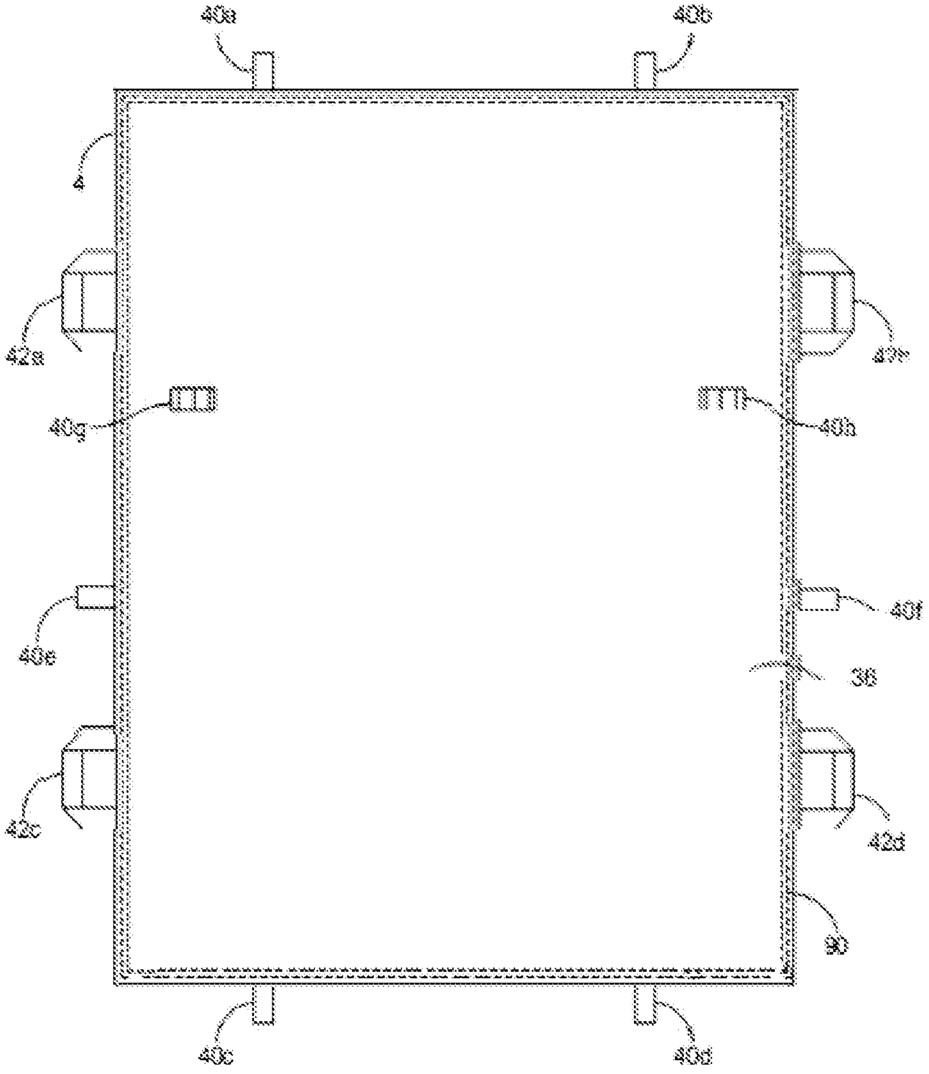
FIG. 4 illustrates a top view of an inflatable transfer device configured for use in an angled operating position, in accordance with some embodiments.

FIGS. 4 and 5 illustrate an embodiment of an inflatable transfer device 2*a* configured for use in an angled operating position, in accordance with some embodiments. The inflatable transfer device 2*a* is substantially similar to the transfer device 2 discussed in conjunction with FIGS. 1-3, and similar description is not repeated herein. The inflatable transfer device 2*a* includes a high-friction surface 36*a* having an outer perimeter substantially equal to the perimeter of the top panel 20. The extended high-friction surface 36*a* prevents movement or slippage of a patient even if the patient is not positioned at in the center of the inflatable transfer device 2*a*.

The inflatable transfer device 2*a* includes additional anchor loops 40*e*-40*f* positioned along the first and second sides 10, 12 of the inflatable transfer device 2*a*. The anchor loops 40*e*-40*f* are configured to be coupled to fasteners located on lateral sides of a support surface, such as an operating table or other support surface. The anchor loops 40*e*-40*f* are similar to the anchor loops 40 discussed above with respect to FIGS. 1-3, and similar description is not repeated herein.

The inflatable transfer device 2*a* includes additional anchor loops 40*g*-40*h* coupled to and/or extending from the high-friction surface 36. The anchor loops 40*g*-40*h* are configured to be coupled to fasteners located on lateral sides of a support surface, such as an operating table or other support surface, when excess material of the inflatable transfer device 2*a* is positioned beneath a bottom panel 22 of the inflatable transfer device 2*a*. For example, in some embodiments, a support surface and/or a patient may be smaller than the support area provided by the high-friction surface 36. A portion of the top panel 20 and/or high-friction surface 36 may be tucked underneath the bottom panel 22, causing the outer profile of the inflatable transfer device 2*a* to be reduced and the anchor loops 40*e*-40*f* to be inaccessible. In such situations, the anchor loops 40*g*-40*h* extending from the high-friction surface 36 may be used to laterally anchor the inflatable transfer device 2*a* to the support surface.

In some embodiments (see FIG. 6), an inflatable transfer device, such as the inflatable transfer device 2*a*, may include one or more straps 44, such as a chest strap and/or a waist strap. Each the straps 44 may be configured to provide additional security to a patient during movement and/or positioning of the inflatable transfer device 2*a*. For example, in some embodiments, one or more straps 44 are configured to maintain a patient in a fixed position with respect to the inflatable transfer device 2*a* when the inflatable transfer device 2*a* and the patient are positioned at an angle by a support surface, such as, for example, during a Trendelenburg, steep Trendelenburg, and/or reverse Trendelenburg procedure. Each of the straps 44 may be formed of a soft, durable material configured to be fastened to one or more anchor points, such as handles 42, a portion of a support surface (e.g., railings of an operating room table), a second portion of the strap 44 itself, etc. Each of the straps 44 may be adjustable, providing additional retention in conjunction with the high-friction foam material 30 and/or providing an additional safety aspect in the case of failure of the inflatable transfer device 2*a* and/or a support surface. In some embodiments, the strap 44 includes a high friction foam material and a substrate similar to the high-friction foam material 36 discussed above.

Figure 6:
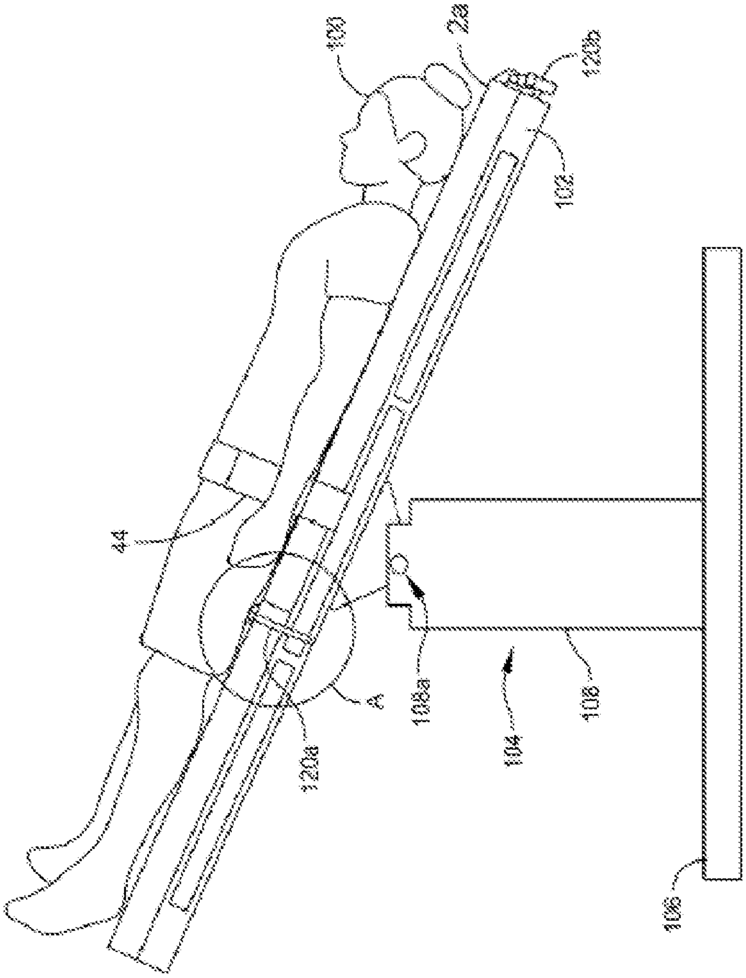
FIG. 6 illustrates a side view of the inflatable transfer device of FIG. 4 positioned between a patient and an operating surface in a Trendelenburg position, in accordance with some embodiments.
Figure 6A:
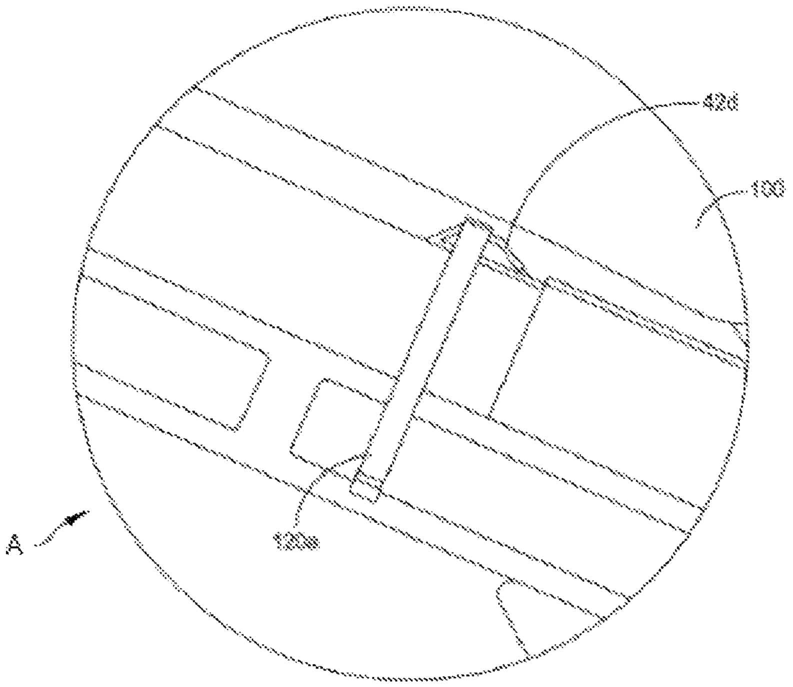
FIG. 6A illustrates an expanded view of the area denoted by circle A in FIG. 6, in accordance with some embodiments.

FIG. 6 illustrates a side view of the inflatable transfer device 2*a* of FIG. 4 positioned between a patient 100 and an operating surface 102 of an operating table 104 in a Trendelenburg position and FIG. 6A illustrates an expanded view of the area denoted by circle A in FIG. 6, in accordance with some embodiments. The operating table 104 includes a support plate 106 coupled to an operating surface 102 by a support pillar 108. The operating surface 102 is configured to be pivoted or angled with respect to a horizontal plane defined by the support plate 106. For example, in the illustrated embodiment, a hinged coupling 110 between an upper end 108*a* of the support pillar 108 and the operating surface 102 allows the operating surface 102 to be tilted (e.g., angled) with respect to the plane defined by the support plate 106. The operating surface 102 may be positioned at any suitable angle, such as, for example, an angle from about 15 degrees to about 25 degrees (Trendelenburg/reverse Trendelenburg position), an angle from about 25 degrees to about 45 degrees (steep Trendelenburg position), an angle from about 15 degrees to about 45 degrees, and/or any other suitable angle.

As shown in FIGS. 6 and 6A, in some embodiments, one or more fasteners 120*a*, 120*b* (collectively "fasteners 120") are configured to couple the inflatable transfer device 2*a* to the operating surface 102 of an operating table 104. In some embodiments, the fasteners 120 are configured to wrap around a portion of the inflatable transfer device 2*a*, such as the anchor loops 40 and/or the handles 42. The fasteners 120 can be wrapped around an anchor loop 40 and/or a handle 42 to define a second loop. In the illustrated embodiment, the fasteners 120 include an elongate fastener including a fabric material and one or more anchoring mechanisms. A male portion of the anchoring mechanism may be coupled to a female portion of the anchoring mechanism to maintain the loop of the fastener 120. The fastener 120 may include one or more adjustment mechanisms, such as multiple female and/or male coupling points, belts, etc. for increasing and/or decreasing the size of the loop to accommodate various styles of operating table and/or locations of anchor loops 40. Suitable anchoring mechanisms may include, but are not limited to, hook and loop fasteners, snap fasteners, buckles, adhesives, belts, non-adhesive tapes, etc. The fasteners 120 are configured to be coupled to one or more elements of the inflatable transfer device 2, such as, for example, the anchor loops 40 and/or the handles 42.

Although embodiments are discussed herein including fasteners 120 configured to be looped around the anchor loops 40, it will be appreciated that any suitable fastener 120 may be used. For example, in some embodiments, each of the fasteners 120 may include a male and/or female portion of an anchoring mechanism and each of the anchor loops 40 may include a complimentary female and/or male portion of the anchoring mechanism. The first portion of the anchoring mechanism on the fasteners 120 may be directly coupled to the second portion of the anchoring mechanism on the anchor loops 40 to maintain the inflatable transfer device 2 in a fixed position with respect to the operating surface 102.

Figure 7:
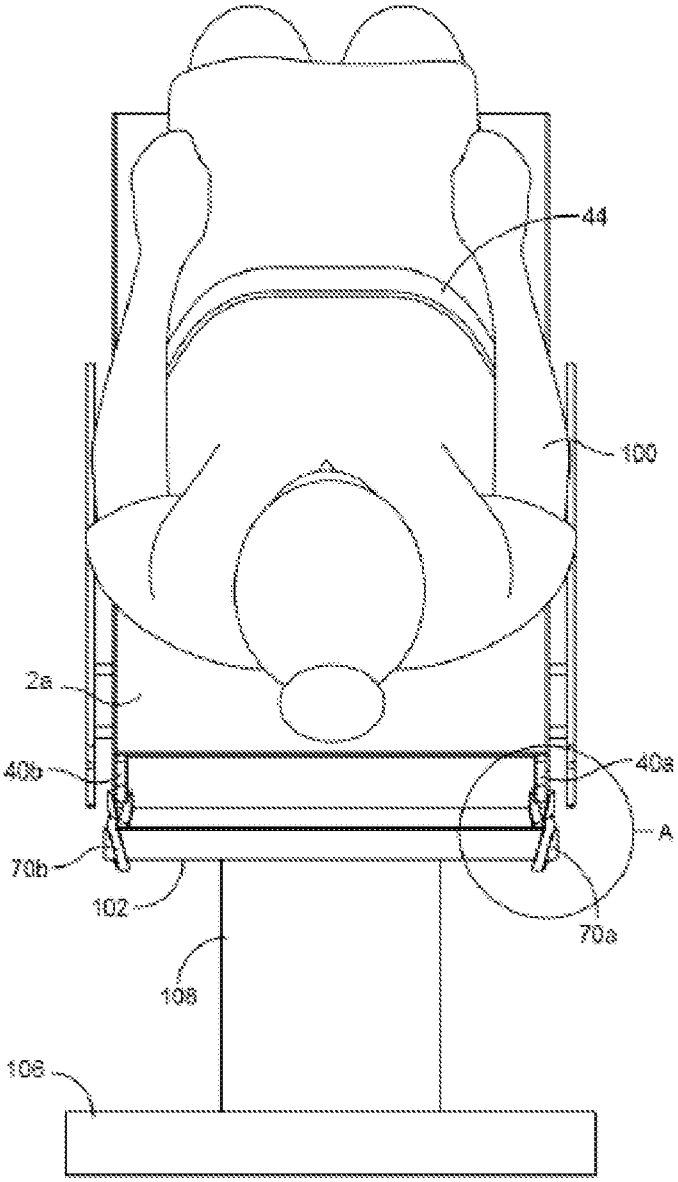
FIG. 7 illustrates a superior view of the inflatable transfer device, patient, and operating surface of FIG. 6, in accordance with some embodiments.
Figure 7A:
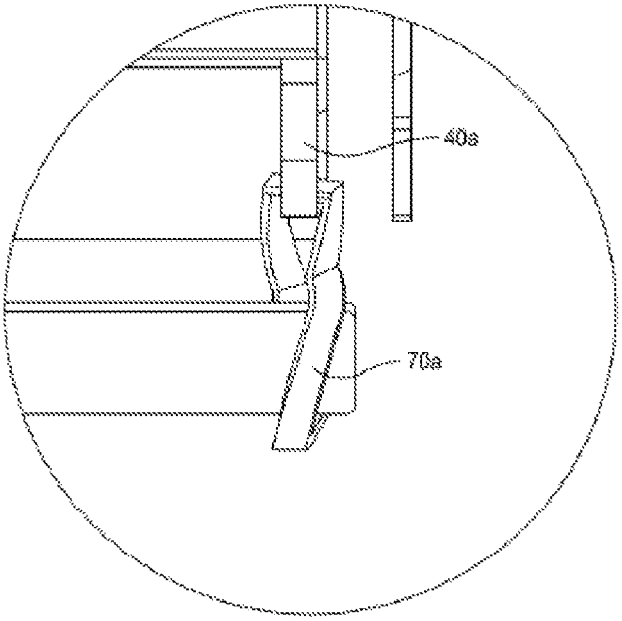
FIG. 7A illustrates an expanded view of the area denoted by circle A in FIG. 7, in accordance with some embodiments.

FIG. 7 illustrates a superior view of the inflatable transfer device 2*a*, patient 100, and operating surface 102 of FIG. 6 and FIG. 7A illustrates an expanded view of the area denoted by circle A in FIG. 7, in accordance with some embodiments. As shown in FIGS. 7 and 7A, fasteners 120 may be coupled to and/or extend from a superior end 102*b* of the operating surface 102. The fasteners 120 at the superior end 102*b* are configured to maintain the superior-inferior position of the inflatable transfer device 2*a* while the patient 100, the operating surface 102, and the inflatable transfer device 2*a* are in an angled position (e.g., a Trendelenburg position, a reverse Trendelenburg position, a steep Trendelenburg position, etc.). Although embodiments are illustrated with similar anchoring mechanisms for each of the fasteners 120, it will be appreciated that one or more of the fasteners may use a different anchoring mechanism. For example, in some embodiments, the fasteners 120 coupled to anchor loops 40*a*-40*d* at a superior and/or inferior end 6, 8 of the inflatable transfer device 2*a* and the operating surface 102 may include a hook and loop fastener while the fasteners 120 configured to be coupled to anchor loops 40*e*-40*h* at lateral sides 10, 12 of the inflatable transfer device 2*a* may include snap or other anchoring mechanisms. It will be appreciated that any suitable combination of anchoring mechanisms may be used.

FIGS. 8-11 illustrate an inflatable transfer device 2*b* configured for use in an angled operating position and including a perineal cutout 50, in accordance with some embodiments. The inflatable transfer device 2*b* is similar to the inflatable transfer devices 2, 2*a* described above in conjunction with FIGS. 1-7A, and similar description is not repeated herein. The inflatable transfer device 2*b* includes a perineal cutout 50 that is configured to provide additional patient access during a surgical procedure including positioning of a patient in an angled operating position.

The inflatable transfer device 2*b* includes a top panel 20 and a bottom panel 22 coupled together by a perimeter band 60. In some embodiments, an outer perimeter edge 24*a* on the first and second lateral sides 10, 12 of the top panel 20 is coupled to an upper edge 62*b* of the perimeter band 60 and an outer perimeter edge 24*b* on the first and second lateral sides 10, 12, of the bottom panel 22 is coupled to a lower edge 62*b* of the perimeter band 60. The top panel 20 and the bottom panel 22 may be directly coupled at a superior end 6 and/or an inferior end 8 and/or may be coupled through a portion of the perimeter band 60. The top panel 20, the bottom panel 22, and the perimeter band 60 define an inflatable internal chamber 26*a* therebetween.

In some embodiments, the inferior end 8 of the inflatable transfer device 2*b* defines the perineal cutout 50. The inferior end 8 of each of the outer perimeter edge 24*a* of the top panel 20 and/or the outer perimeter edge 24*b* of the bottom panel 22 includes an inset portion defined by a first angled wall 64*a*, a horizontal wall 66, and a second angled wall 64*b*. When coupled to each other and/or the perimeter band 60, the first angled wall 64*a*, the horizontal wall 66, and the second angle wall 64*b* of the top panel 20 and/or the bottom panel 22 define the cutout 50 in the inferior end 8 of the inflatable transfer device 2.

Figure 12:
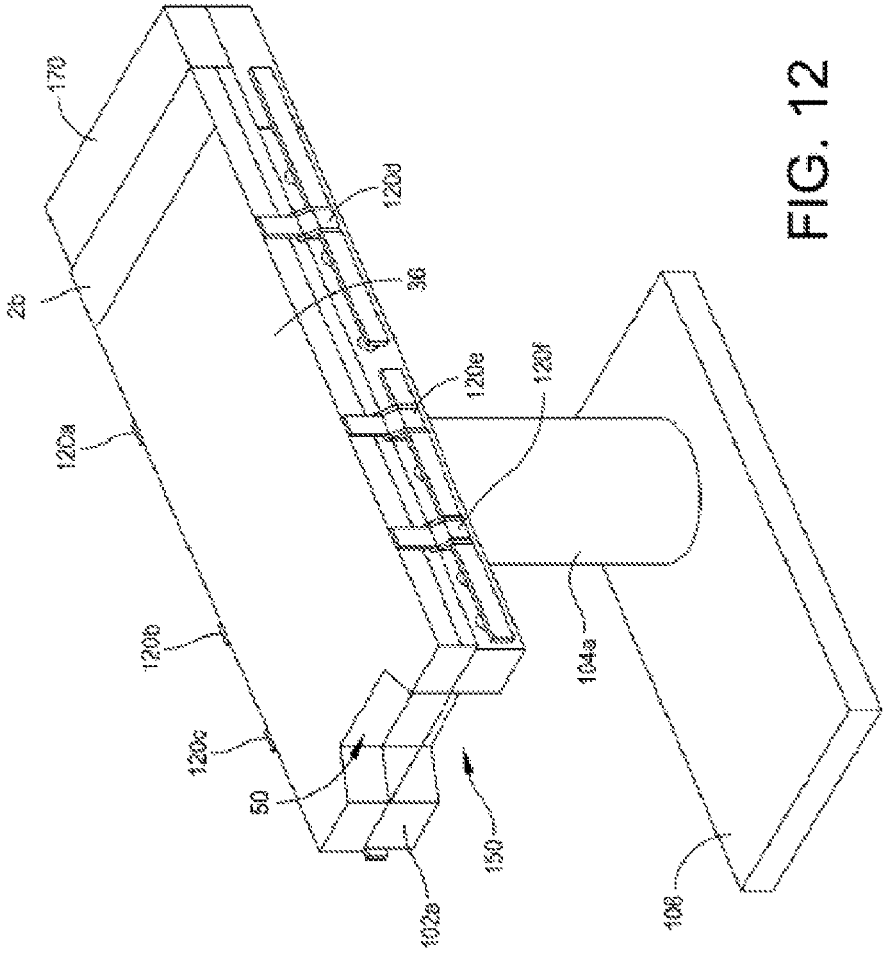
FIG. 12 illustrates a top perspective view of the inflatable transfer device of FIG. 8 coupled to an adjustable operating table, in accordance with some embodiments.

The dimension of the cutout 50, and specifically the dimensions of the angled walls 64*a*, 64*b* and the horizontal wall 66, are selected to allow access to a perineum region when a patient is positioned on the inflatable transfer device 2*b* and an associated surgical table having a complimentary cutout. For example, as illustrated in FIG. 12, the inflatable transfer device 2*b* may be positioned above and coupled to an operating surface 102*a* of an operating table 104*a* having a perineal cutout 150 defined in the operating surface 102*a*. The dimensions of the perineal cutout 50 of the inflatable transfer device 2*b* may be substantially equal to the dimensions of the perineal cutout 150 defined in the operating surface 102*a*.

In some embodiments, for example as illustrated in FIG. 12, the inflatable transfer device 2*b* may include a plurality of lateral fasteners 122*a*-122*h* (collectively "lateral fasteners 122") configured to couple the inflatable transfer device 2*b* to the operating surface 102*a*. The lateral fasteners 122 are similar to the fasteners 120 described above in conjunction with FIGS. 6-7A, and similar description is not repeated herein. The lateral fasteners 122 are disposed on and extend from the lateral edges 10, 12 of the inflatable transfer device 2*b*. Each of the lateral fasteners 122 is configured to be wrapped around and/or otherwise coupled to a portion of an operating table 104*a*, such as, for example, one or more rails 124 extending from the operating table 104*a*.

With reference back to FIG. 8, in some embodiments, the inflatable transfer device 2*b* includes one or more high-friction longitudinal contact strips 72*a*-72*b* (collectively "longitudinal contact strips 72"). The longitudinal contact strips 72 include a high-friction material configured to interact with and provide a friction coupling between the inflatable transfer device 2*b* and a portion of an operating table 104*a*. The longitudinal contact strips 72 are configured to additionally and/or alternatively secure the inflatable transfer device 2*b* to the operating surface 102*a*. In some embodiments, the longitudinal contact strips 72 include a high-friction material, such as a high-friction foam. The longitudinal contact strips 72 may include a similar and/or different material as the high-friction surface 36. The longitudinal contact strips 72 are positioned on the inflatable transfer device 2*b* such that the longitudinal contact strips 72 abut a portion of the operating table 104*a* when the inflatable transfer mattress 2*b* is positioned on the operating surface 102*a* and excess material (if any) is positioned beneath the inflatable transfer device 2*b*.

In some embodiments, the inflatable transfer device 2*b* includes one or more high-friction rail patches 74*a*-74*f* (collectively "rail patches 74"). The rail patches 74 include a high-friction material configured to interact with and provide a friction coupling between the inflatable transfer device 2*b* and a portion of an operating table 104*a*. The rail patches 74 are configured to additionally and/or alternatively secure the inflatable transfer device 2*b* to the operating surface 102*a*. In some embodiments, the rail patches 74 include high-friction material, such as a high-friction foam. The rail patches 74 may include a strip (or other shape) of high-friction material extending substantially in a first predetermined direction. The rail patches 74 are positioned on the inflatable transfer device 2*b* such that the rail patches 74 abut a portion of the operating table 104*a* when the inflatable transfer device 2*b* is positioned on the operating surface 102*a* and excess material (if any) is positioned beneath the inflatable transfer device 2*b*.

In some embodiments, the inflatable transfer device 2*b* includes one or more high-friction longitudinal patches 76*a*-76*b* (collectively "longitudinal patches 76"). The longitudinal patches 76 include a high-friction material configured to interact with and provide a friction coupling between the inflatable transfer device 2*b* and a portion of an operating table 104*a*. The longitudinal patches 76 are configured to additionally and/or alternatively secure the inflatable transfer device 2*b* to the operating surface 102*a*. In some embodiments, the longitudinal patches 76 include a high-friction material, such as a high-friction foam. The longitudinal patches 76 may include a similar and/or different material as the high-friction surface 36. The longitudinal patches 76 are positioned on the inflatable transfer device 2*b* such that the longitudinal patches 76 abut a portion of the operating table 104*a* when the inflatable transfer mattress 2*b* is positioned on the operating surface 102*a* and excess material (if any) is positioned beneath the inflatable transfer device 2*b*.

Figure 11:
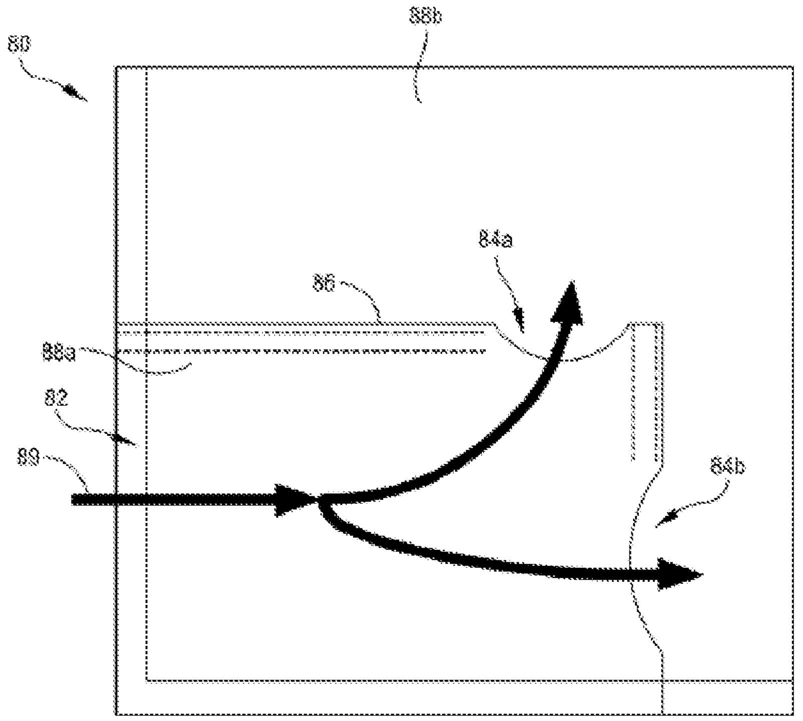
FIG. 11 illustrates an air intake manifold of the inflatable transfer device of FIG. 8, in accordance with some embodiments.

In some embodiments, the inflatable transfer device 2*b* may include one or more air manifolds 80*a*, 80*b* (collectively "air manifolds 80") configured to receive an air flow therein from an air source. The air flow is configured to enter the internal chamber 26 to inflate the inflatable transfer device 2*b*. The air manifolds 80 may be positioned at any suitable location on the inflatable transfer device 2*b*. In some embodiments, the air manifolds 80 are positioned adjacent to an inferior end 8 of the inflatable transfer mattress 2*b* to provide access to the air manifolds 80 when a patient is positioned on the inflatable transfer mattress 2*b*, although it will be appreciated that air manifolds 80 may be positioned at any suitable location on the inflatable transfer mattress. In some embodiments, each of the air manifolds 80 includes a coupling mechanism 82 configured to couple an air hose to the respective air manifold 80. As illustrated in FIG. 11, in some embodiments, each air manifold 80 includes an air flow channel 86 defining an air intake 82 and one or more air outflows 84*a*, 84*b* configured to receive and direct an air flow 89 therethrough. The channel 86 may be formed by a first material layer 88*a* coupled to a second material layer 88*b*, such as a portion of the top panel 20 and/or the bottom panel 22.

With reference again to FIG. 8, in some embodiments, the inflatable transfer mattress 2*b* includes one or more foot anchor straps 90*a*, 90*b* (collectively "foot anchor straps 90"). The foot anchor straps 90 may be configured to anchor an inferior end 8 of the inflatable transfer mattress 2*b* to a patient 100 (for example, by being wrapped around the lower extremities of a patient 100) and/or to a portion of an operating table 104. The foot anchor straps 90 include anchors similar to the anchors 120 previously discussed, and similar description is not repeated herein.

Figure 13:
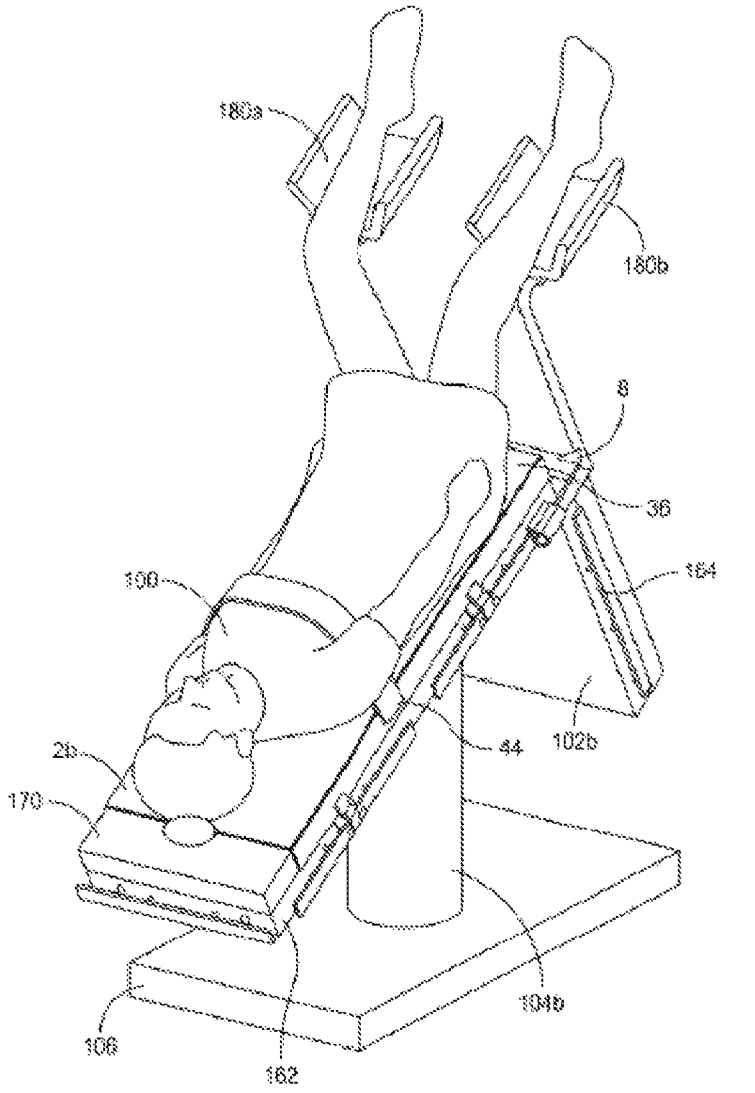
FIG. 13 illustrates a perspective view of a patient position on the inflatable transfer device of FIG. 8 and an adjustable operating table positioned in an angled operating position, in accordance with some embodiments.

FIG. 13 illustrates the inflatable transfer device 2*b* supporting a patient 100 in an angled operating position, in accordance with some embodiments. As shown in FIG. 13, the inflatable transfer device 2*b* may be used with a partially collapsible surgical table 104*b*. The partially collapsible surgical table 104*b* has a hinge 160 between a first portion 162 and a second portion 164. The first portion 162 and the second portion 164 are configured to be angled to allow access to the perineum region of a patient 100 supported by the inflatable transfer device 2 and the operating surface 102*b*. In some embodiments, the first portion 162 includes a perineal cutout similar to the perineal cutout 150 defined by the operating table 104*a*.

In some embodiments, the surgical table 104*b* includes a block 170 configured to provide a fixed anchor point for the inflatable transfer device 2*b* when the operating surface 102*b* is placed at an angled position. The block 170 provides a physical stop against which the inflatable transfer device 2*b* rests when the operating surface 102*b* is angled relative to the plane of the support plate 106.

In the illustrated embodiment, the inflatable transfer device 2*b* is sized and configured to extend only over the first portion 162 of the split surgical support surface 102*b*. In other embodiments, the inflatable transfer device 2*b* may extend over each portion 162, 164 of the operating surface 102*b*, for example, in a deflated state. Although specific embodiments are discussed herein, it will be appreciated that inflatable transfer devicees 2-2*b* discussed herein can be configured with any suitable dimensions to match an operating surface 102-102*b*, a patient, and/or any other physical dimensions.

In some embodiments, the surgical table 104*b* includes one or more patient supports, such as stirrups 180*a*, 180*b* configured to support a portion of a patient during a procedure. The stirrups 180*a*, 180*b* may be configured to extend from a portion of the surgical table 104*b*, such as, for example, one or more rails of the surgical table. In some embodiments, a portion of the inflatable transfer device 2*b*, such as one or more foam rail patches 70 are configured to interact with and/or provide a frictional fit with a portion of the stirrups 180*a*, 180*b* when the stirrups 180*a*, 180*b* are in a deployed position.

Figure 14:
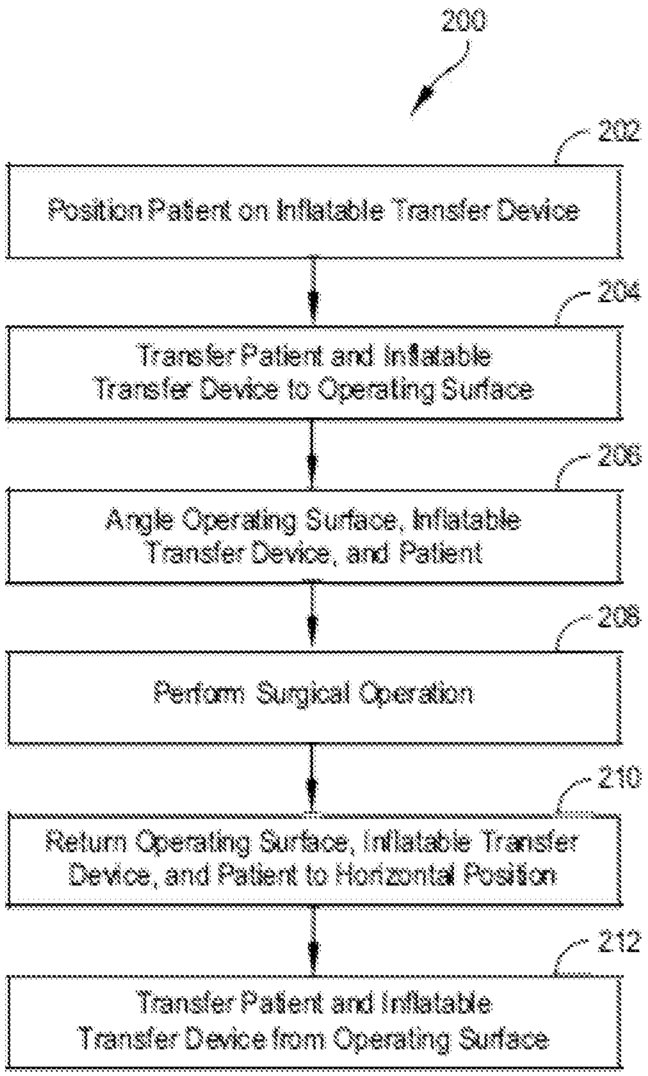
FIG. 14 is a flowchart illustrating a method of performing a surgical operation, in accordance with some embodiments.

FIG. 14 is a flowchart 200 illustrating a method of positioning a patient and performing a surgical procedure, in accordance with some embodiments. The method 200 is described below in conjunction with FIGS. 1-14. At step 202, a patient 100 is positioned on top of an inflatable transfer device, such as any of the inflatable transfer devices 2-2*b* described herein. The inflatable transfer device 2-2*b* is supported by a support structure, such as a patient bed, gurney, surgical table, etc.

At optional step 204, the patient is transported to an operating surface. For example, in some embodiments, a gurney or other moveable support may be positioned adjacent to a surgical table 104 including an operating surface 102. The inflatable transfer device 2 is inflated by coupling an air inflow device to one or more air intakes, such as the air manifolds 80 discussed above. Air flow is provided into the internal chamber 26 to inflate the inflatable transfer device 2. Air outflow from the plurality of perforations 39 formed on the bottom panel 22 creates an air bearing beneath the inflatable transfer device 2, allowing the inflatable transfer device 2, which now supports the patient 100, to be moved from an initial support position onto the adjacent operating surface 102.

At step 206, the operating surface 102 is angled with respect to a support plane, such as, for example, a floor of an operating room and/or a support plate 106 of the operating table 104. The operating surface 102 may be angled using any suitable mechanism, such as, for example, a hinge mechanism built into the operating table 104. As the operating surface 102 is angled, the patient 100 is maintained in a fixed position with respect to the operating surface 102 and the inflatable transfer device 2-2*b* by the high-friction surface 30 coupled to the top panel 20. The high-friction surface 30 prevents sliding and/or slipping of the patient 100 in the angled position. The inflatable transfer device 2 may be maintained in an inflated state or a deflated state during angling and/or subsequent surgical procedures.

In some embodiments, the operating surface 102 is positioned at an angle suitable for a surgical procedure. Various positions may include, but are not limited to, a Trendelenburg position, a reverse Trendelenburg position, and/or a steep Trendelenburg position. The operating surface 102 may be positioned at any suitable angle, such as, for example, an angle between 15 and 25 degrees, an angle between 25 and 45 degrees, an angle between 15 and 45 degrees, and/or any other suitable angle.

At step 208, a surgical procedure is performed on the patient 100 while the patient 100 is maintained in the angled position. The surgical procedure may be any suitable surgical procedure, including traditional surgery and/or robotic surgery. The surgical procedure 208 may be performed with the inflatable transfer device 2-2*b* in an inflated or deflated state.

At step 210, the operating surface 102 is returned to a horizontal position that is parallel with a plane defined by the support surface and, at step 112, the patient 100 is transported from the operating surface to a different surface, such as a transport surface (e.g., a gurney) or other surgical bed. The patient 100 may be maintained on the inflatable transfer device 2-2*b* during transportation, recovery, etc. without needing to disturb the patient 100.

Although the subject matter has been described in terms of exemplary embodiments, it is not limited thereto. Rather, the appended claims should be construed broadly, to include other variants and embodiments, which may be made by those skilled in the art.

What is claimed is:

1. An inflatable transfer device, comprising:

a non-skid material coupled to a substrate and formed integrally with a top panel;

a bottom panel coupled to the top panel to define an inflatable chamber therebetween;

a rail patch made of a non-skid material with a long axis extending parallel to a long axis of a corresponding lateral fastener that extends from a lateral edge of the inflatable transfer device; and an air manifold including an air flow channel that is defined by a first material layer coupled to a second material layer, both the first material layer and the second material layer being only one of the top panel or the bottom panel; wherein the non-skid material coupled to the substrate is configured to maintain a patient in a fixed position when the inflatable transfer device and the patient are positioned at an angle with respect to a horizontal support surface.

2. The inflatable transfer device of claim 1, wherein the non-skid material comprises a non-skid foam material.

3. The inflatable transfer device of claim 2, wherein the non-skid foam material is selected from the group consisting of: a closed cell breathable foam and an open cell elastomeric non-latex foam.

4. The inflatable transfer device of claim 1, wherein the substrate is between the non-skid material and the top panel.

5. The inflatable transfer device of claim 4, wherein the substrate is selected from the group consisting of: nylon, polyester, a three-dimensional fabric, a spacer fabric, and non-woven material.

6. The inflatable transfer device of claim 1, wherein the non-skid material is at least partially directly coupled to at least one of a plurality of stringers.

7. The inflatable transfer device of claim 1, wherein the non-skid surface has an outer perimeter substantially equal to a perimeter of the top panel.

8. The inflatable transfer device of claim 1, further comprising at least one anchor loop configured to provide an attachment point for coupling the inflatable transfer device to a support surface.

9. The inflatable transfer device of claim 1, further comprising a perineal cutout at an inferior end of the inflatable transfer device.

10. The inflatable transfer device of claim 1, further comprising at least one longitudinally extending contact strip including an edge in contact with the rail patch.

11. An inflatable transfer device, comprising:

a non-skid material foam coupled to a substrate and formed integrally with a top panel;

a bottom panel coupled to the top panel to define an inflatable chamber therebetween; and an air manifold including an air flow channel that is defined by a first material layer coupled to a second material layer, both the first material layer and the second material layer being only one of the top panel or the bottom panel, wherein the non-skid foam material is configured to maintain a patient in a fixed position when the inflatable transfer device and the patient are positioned at an angle with respect to a horizontal support surface, and the substrate is configured to reduce elongation of the non-skid foam material.

12. The inflatable transfer device of claim 11, comprising at least one anchor loop configured to provide an attachment point for coupling the inflatable transfer device to a support surface.

13. The inflatable transfer device of claim 11, wherein the air manifold defines an air inlet and at least two air outflow paths, and an outlet of one of the at least two air outflow paths is larger than an outlet of another one of the at least two air outflow paths.

14. A patient positioning device, comprising:

a top panel defining a portion of an inflatable cavity and including an outer non-skid surface configured to maintain a patient in a fixed position when the patient positioning device is angled; and an air manifold including an air flow channel that is defined by a first material layer coupled to a second material layer, wherein both the first material layer and the second material layer are only one of the top panel or a bottom panel.

15. The patient positioning device of claim 14, wherein the outer non-skid surface includes a non-skid foam material from a group consisting of a closed cell breathable foam, an open cell, an elastomeric, and a non-latex foam.

16. The patient positioning device of claim 14, wherein the non-skid surface further includes a substrate configured to reduce or prevent elongation of the outer non-skid surface during use.

17. The patient positioning device of claim 16, wherein the outer non-skid surface is releasably coupled to the top panel.

18. The patient positioning device of claim 14, wherein the air manifold defines an air inlet and at least two air outflow paths on adjacent sides of the air manifold, and an outlet of one of the at least two air outflow paths is larger than an outlet of another one of the at least two air outflow paths.

19. The patient positioning device of claim 14, further comprising an anchor loop configured to provide an attachment point for coupling the patient positioning device to a support surface.

* * * * *